(12) United States Patent
Nadershashi et al.

(10) Patent No.: US 6,778,480 B2
(45) Date of Patent: Aug. 17, 2004

(54) METHOD AND APPARATUS FOR AUTOMATIC SLIP DEFECT MANAGEMENT IN A DVD DRIVE

(75) Inventors: Nedi Nadershashi, Pleasanton, CA (US); Chen-Chi Chou, Milpitas, CA (US)

(73) Assignee: Zoran Corporation, Sunnyvale, CA (US)

(*) Notice: Subject to any disclaimer, the term of this patent is extended or adjusted under 35 U.S.C. 154(b) by 0 days.

(21) Appl. No.: 10/158,440

(22) Filed: May 30, 2002

(65) Prior Publication Data

US 2003/0223328 A1 Dec. 4, 2003

(51) Int. Cl.$^7$ ................................................ G11B 7/00
(52) U.S. Cl. ............................................... 369/53.15
(58) Field of Search .................... 369/53.15, 53.12, 369/53.17, 47.14

(56) References Cited

U.S. PATENT DOCUMENTS 5,841,748 A * 11/1998 Yamamuro ............... 369/53.15
6,385,148 B2 * 5/2002 Ito et al. .................. 369/53.15

FOREIGN PATENT DOCUMENTS

JP 11-126336 * 5/1999 ............. 369/53.15

* cited by examiner

Primary Examiner—Nabil Hindi
(74) Attorney, Agent, or Firm—Wildman, Harrold, Allen & Dixon LLP

(57) ABSTRACT

A slip defect management apparatus and method efficiently avoids processing of bad data read from a DVD and provides very rapid slipping of defective sectors in a write operation.

8 Claims, 9 Drawing Sheets

Table 1

| Sector Integrity | Good | Good | Good | Defective | Good | Good |
|---|---|---|---|---|---|---|
| Physical Sector | N | N+1 | N+2 | N+3 | N+4 | N+5 |
| Slip/Logical Block | M | M+1 | M+2 | — | M+3 | N+4 |
| Skip/Logical Block ID | M | M+1 | M+2 | — | M+4 | M+5 |

FIG. 1
(Prior Art)

Data Buffer Contents

| Data Associated w/ Physical Sector # | Physical Sector Quality | Data Associated w/ Logical Sector ID |
|---|---|---|
| N | Good | M |
| N+1 | Defective | — |
| N+2 | Good | M+1 |
| N+3 | Good | M+2 |
| N+4 | Good | M+3 |
| N+5 | Defective | — |
| N+6 | Good | M+4 |
| ⋮ | ⋮ | — |
| N+33 | Good | M+31 |

FIG. 4A
(Prior Art)

Data Buffer Contents

| Data Associated w/ Physical Sector # | Physical Sector Quality | Data Associated w/ Logical Sector ID |
|---|---|---|
| N | Good | M |
| N+2 | Good | M+1 |
| N+3 | Good | M+2 |
| N+4 | Good | M+3 |
| N+6 | Good | M+4 |
| ⋮ | ⋮ | ⋮ |
| N+33 | Good | M+31 |

FIG. 4B
(Prior Art)

METHOD AND APPARATUS FOR AUTOMATIC SLIP DEFECT MANAGEMENT IN A DVD DRIVE

The present invention relates generally to Digital Video Disc (DVD) drives, and particularly to a method and an apparatus for automatically preventing data from being written to or copied from defective physical sectors of a DVD.

BACKGROUND OF THE INVENTION

DVD, an acronym for Digital Video Disc or Digital Versatile Disc, is a generic name for Compact-Discs recorded in a variety of formats. With a minimum capacity of approximately 4.7 gigabytes, a typical DVD can store a full length motion picture. A great deal more storage is possible using multi-layer technology, advanced compression schemes and shorter wavelength optical beams. There are currently several DVD physical formats in use. Among them are DVD-ROM, DVD-RAM, DVD-RW, DVD+RW and DVD-R. Other formats are in various stages of development.

Compact Discs store data in physical areas on the disc known as sectors. Some of these sectors are determined to be defective either during the manufacturing process or at the time of data recording due, for example, to process imperfections and impurities such as foreign particles embedded onto the surface of the disc. Such defects frequently render the flawed area of the disc unusable; however, where there are not too many defects, rather than discarding the entire disc, methods are employed to identify the defects so they can be avoided. Conventionally, the storage medium is tested after manufacturing to determine those sectors with defective segments. The corresponding sector IDs (i.e., a physical addresses or other unique identifier of a sector) are compiled into a primary defect list (PDL) which is then stored on a designated area of the disc.

Between the time of manufacture and the time of recording, additional defects may result from, e.g., handling or exposure to the environment. Any additional defective sectors must thus be identified prior to recording. The process of scanning for defects prior to recording is called disc "certification." Addresses for those additional defective sectors are listed in a secondary defect list (SDL).

Once all of the defective sectors have been identified, the DVD (or the computer controlling the DVD) can keep track of the physical location ("physical sector") where a sector of data ("logical sector") is to be written. The DVD recording process stores logical sectors on physical sectors of the disk according to an identifier typically referred to as a logical sector (ID). Thus, two logical sectors with contiguous IDs will be stored in adjacent physical sectors, provided that neither physical sector is defective. A defect management scheme determines where the logical sector of data with the next ID should be physically located on the DVD when a defective physical sector is encountered.

FIG. 1 illustrates two defect management schemes, "Slip" and "Skip." The first two rows indicate that physical sectors N–N+2 and N+4–N+5 are good, while physical sector N+3 is defective. In the absence of defects, both defect management schemes record logical sectors M–M+2 in physical sectors N–N+2. Upon encountering defective physical sector N+3, a Slip Defect Management Scheme dictates that the next logical sector, M+3, be recorded in the closest good physical sector, N+4. Thereafter, logical sector M+4 is recorded in physical sector, N+5.

In contrast, a Skip Defect Management Scheme responds to defective physical sector N+3 by skipping the recording of logical sector M+3 on the current track. Recording on the current track continues, and the data associated with the next logical sector ID is recorded in the next good physical sector, N+4. After completing the recording of the current track, skipped logical sectors are recorded on an alternate track of the DVD.

On a DVD, logical sectors of data are grouped into Error Correction Code (ECC) Blocks. A typical ECC Block includes up to 16 contiguous logical sectors of user data, in addition to parity data. Each logical sector typically includes 2 Kbytes of data and begins with the sector's ID. FIG. 2 illustrates schematically one example of an ECC Block 20 including 208 rows, each 182 bytes long. One-hundred-ninety-two of the two-hundred-eight rows of ECC Block 20 include 172 bytes of data and 10 bytes of Parity Inward (PI) data and check bytes. The remaining 16 rows of ECC Block 20 are devoted to Parity Outward (PO) data and check bytes. While illustrated in FIG. 2 as located adjacent one another, these sixteen rows are interleaved between the other, non-PO rows, one PO row to every 12 non-PO rows. Thus, of the 37 Kbytes included within ECC Block 20, only 32 Kbytes represent user data. FIG. 3 illustrates one example of a DVD Player, which includes an Optical pick-up Unit (OPU), a Read channel, Parity Error Correction Module, a Memory Interface and a Data Buffer. The OPU converts information read from the physical sectors of a DVD into an analog RF signal. The Read Channel converts the RF signals into digital signals. The Parity Error Correction Module uses the PI and PO bytes of the ECC Block to correct parity errors. The Memory Interface then places the logical sectors of the ECC Block into the Data Buffer.

FIG. 4A illustrates symbolically the contents of the Data Buffer after initial processing of a pair of contiguous ECC Blocks. (Note: it is assumed that the Slip Defect Management Scheme was used during the recording process.) The data read from thirty-four physical sectors, N–N+33, are stored therein. Two of these physical sectors are defective, physical sector IDs N+1 and N+5, and store corrupted data, rather than user data. Thus, these thirty four physical sectors correspond to just thirty-two logical sectors of data, logical sector IDs M–M+31. Interjected between the data associated with these logical sectors is the corrupted data read from the defective physical sectors. As such, the data within the Data Buffer is not organized in the fashion required by the Display Device that reads the Data Buffer. FIG. 4B illustrates symbolically the desired organization of the Data Buffer given the same pair of ECC Blocks. The Data Buffer contains the data associated with thirty-two contiguous logical sectors, without any corrupted data associated with the defective physical sectors.

Various methods have been used for rearranging the data within the Data Buffer into the desired order. One approach uses software external to the DVD Player to rearrange the data within Data Buffer. This approach is time intensive, primarily because of the memory constraints of the Data Buffer. The other approach adds a second Data Buffer to the DVD, thereby decreasing the time required to arrange data in Logical Sector ID order, but increasing the cost of the DVD player. Thus, a need exists for a cost effective and efficient method and apparatus for copying logical sectors of data into a data buffer in order of logical sector ID. Likewise, in write to disc operations, firmware usually controls the operation which will create disjointed write extents every time a defective sector is encountered. The firmware will typically write a defect in a different way causing a disruption in the flow of data and then proceed past the defect and revert to the traditional sequential write schemes. This stop-start firmware controlled defect management scheme results in extremely low performance. Thus, a need also exists for a cost effective and efficient method and apparatus for writing logical sectors of data to disc.

BRIEF DESCRIPTION OF THE DRAWINGS

Additional features of the invention will be more readily apparent from the following detailed description and appended claims when taken in conjunction with the drawings, in which:

FIG. 1 illustrates a Table which generally shows slip and skip defect management schemes.

FIG. 4A illustrates symbolically the contents of a Data Buffer after initial processing of a pair of ECC Blocks.

FIG. 4B illustrates symbolically the desired organization of the Data Buffer.

DESCRIPTION OF THE PREFERRED EMBODIMENTS

Figure 2:
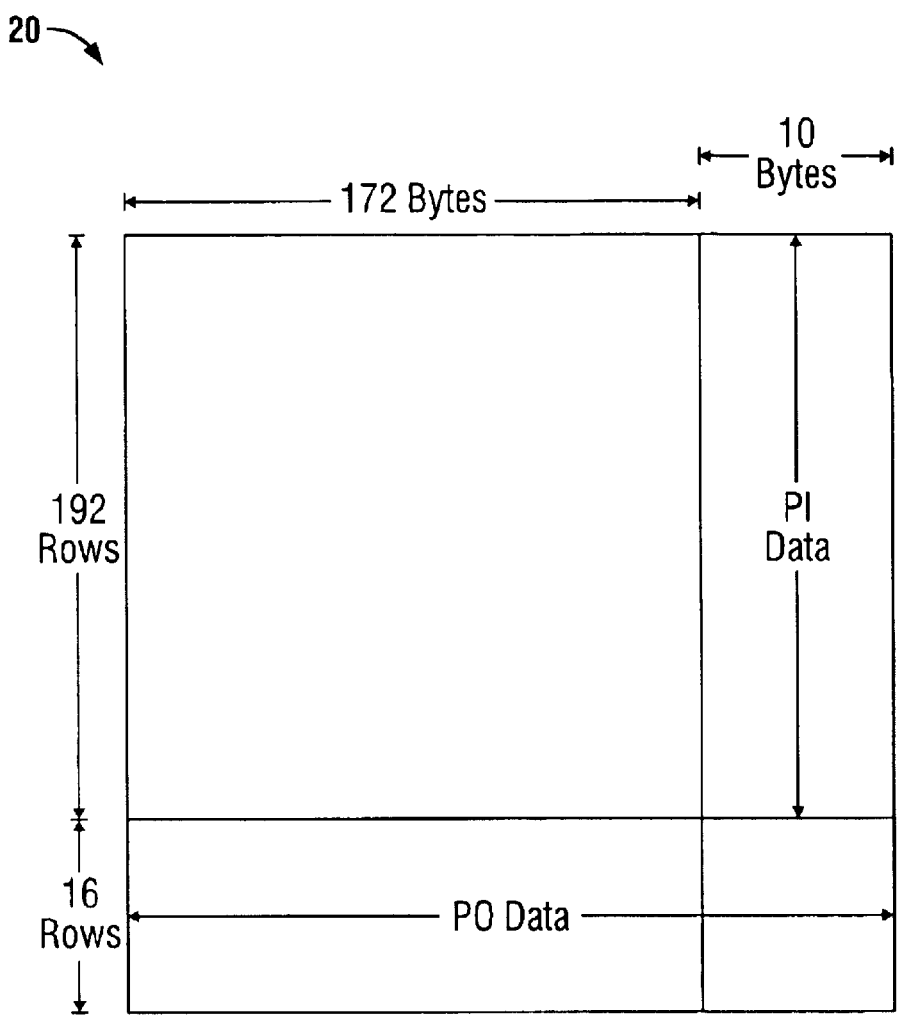
FIG. 2 illustrates schematically an ECC Block.
Figure 3:
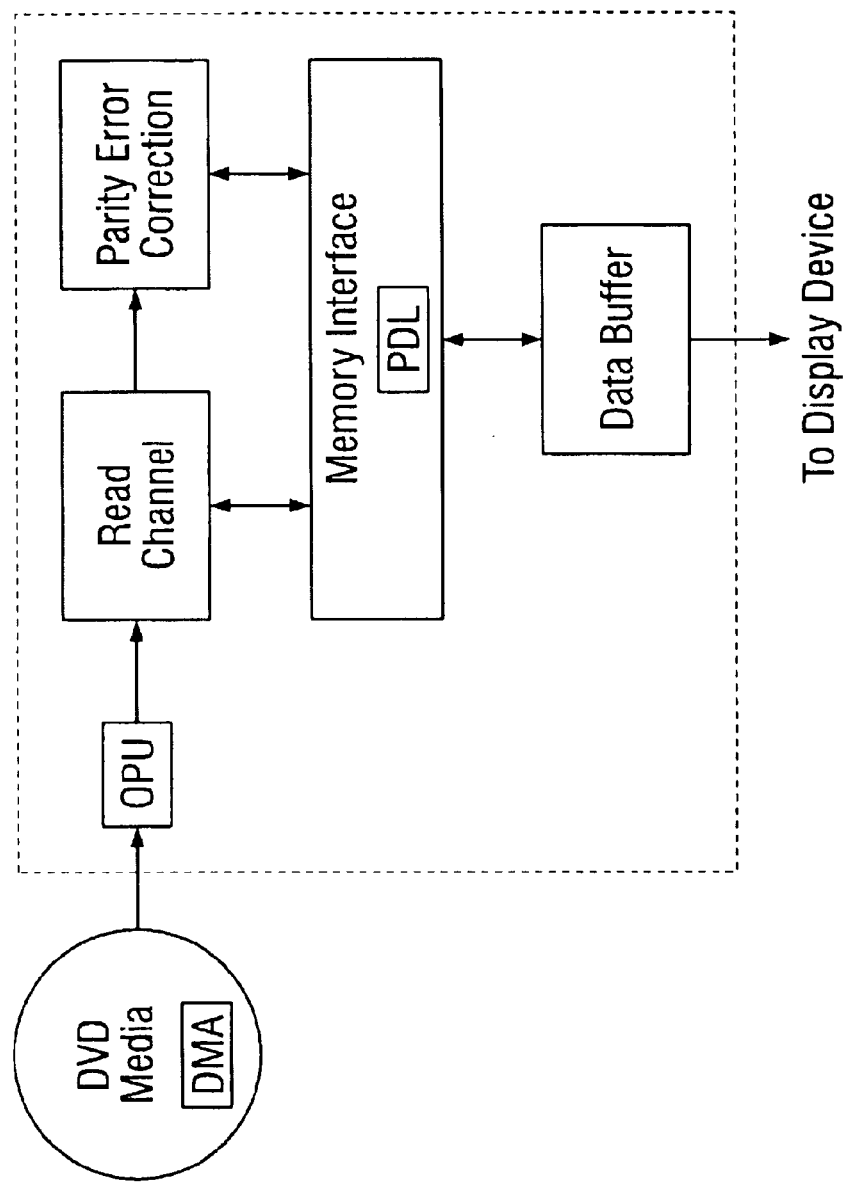
FIG. 3 illustrates a prior art DVD player/recorder.

By way of introduction, apparatus described in this application include a plurality of components such as computer software and/or hardware components. A number of such components can be combined or divided in different configurations. For example, the invention may be implemented employing at least one computer-readable signal-bearing medium. One example of a computer-readable signal-bearing medium comprises an instance of recordable data storage medium such as one or more of a magnetic, optical, biological, and atomic data storage medium. In another example, a computer-readable signal-bearing medium comprises a modulated carrier signal transmitted over a network comprising or coupled with systems according to the present invention. For instance, one or more of a telephone network, a local area network ("LAN"), the Internet, and a wireless network may be included. An exemplary component of systems according to the present invention employ and/or comprise a series of computer instructions written in or implemented with any of a number of programming languages, as will be appreciated by those skilled in the art.

The apparatus of the present invention reads data from a DVD whose defective physical sectors have been slipped during the recording process and also writes data to the DVD only in those sectors that are not determined to be defective. In the read operation, the apparatus automatically copies the logical sectors of data from the DVD into a data buffer (memory) in order of their logical sector IDs without copying any corrupted data associated with defective physical sectors. The apparatus includes a physical defect memory, a search module, a synchronization module and a buffer interface. The physical defect memory stores a Primary Defect List (PDL), which is a list of the physical addresses of the defective physical sectors of the DVD. The search module searches the PDL for a physical sector address matching that included in a first set of signals representing the current sector being read or to be written of the DVD. In order to save time, the search module may create a short table or cache of defective sectors from the PDL in the vicinity of the sectors that are currently being read or written. In this way, the search will converge quickly. If the search module determines that a physical sector address matches that associated with the first sector, then the search module activates a slip signal. The slip signal interrupts writing of data to the buffer in the case of a read operation, or, in the case of a write to disc operation, reading data from the buffer is suppressed until the defective sector has been passed over. On the other hand, if the search module does not find a physical sector address matching that associated with the first sector, then the search module does not output a slip signal and the data is permitted to be read from or written to the buffer.

In another aspect of the invention, a synchronization module analyzes timing signals read from the disc to generate a timing signal having a multiplicity of pulses, provided that the slip signal is not activated. If the slip signal is activated, the synchronization module holds the timing signal inactive. The buffer interface synchronously copies data into the data buffer, provided that the timing signal is active. If the timing signal is inactive due to the assertion of the slip signal, the buffer interface will not read or write data into the data buffer. Thus, the apparatus of the present invention prevents the corrupted data associated with a defective physical sector from being copied into the data buffer and prevents data from being written to physical sectors that have been identified as defective.

Figure 5:
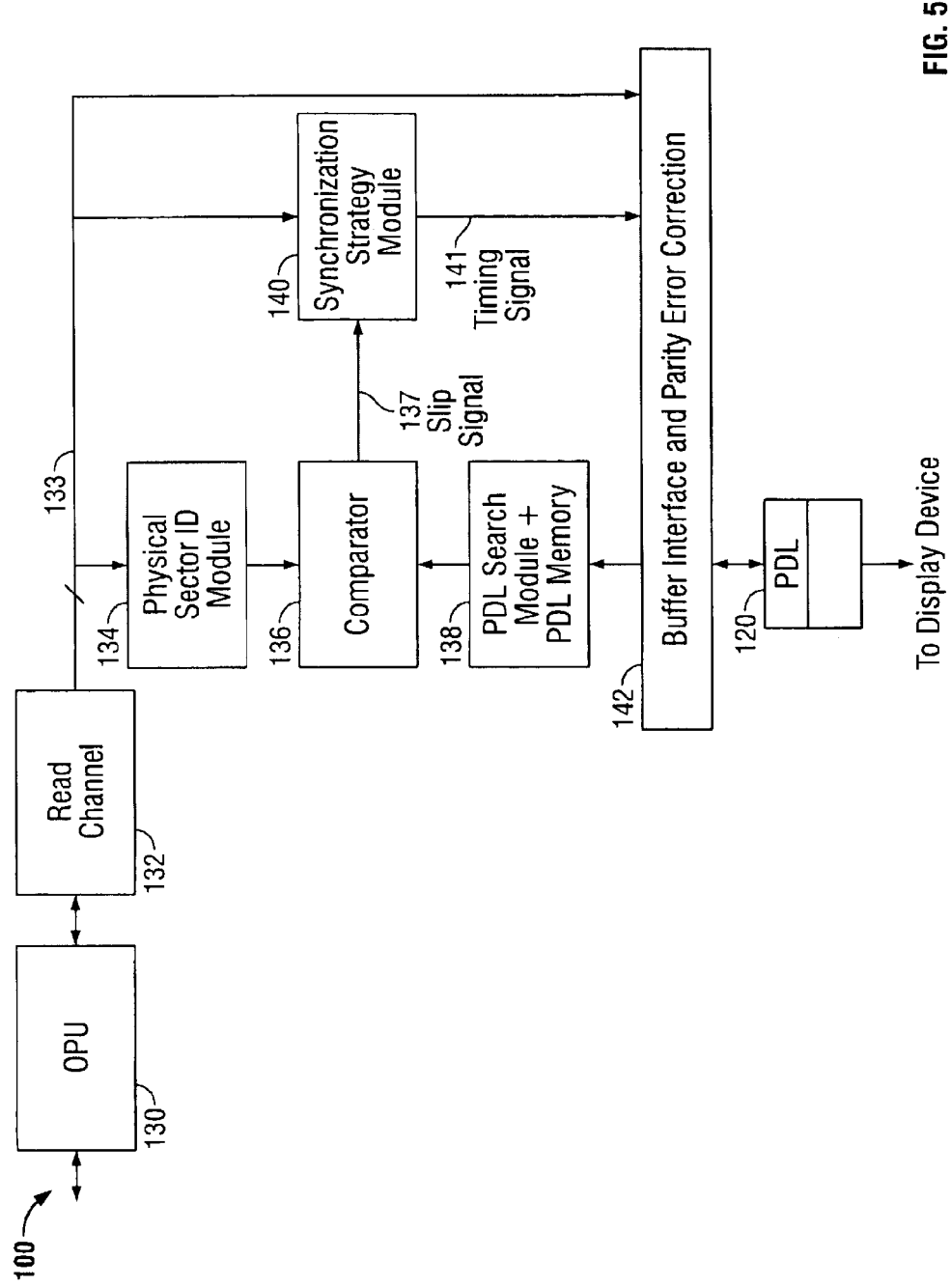
FIG. 5 illustrates in block diagram form aspects of a DVD in accordance with the invention.

With reference to FIG. 5, a DVD Player 100 includes optical pickup unit (OPU) 130, Read Channel 132, Physical Sector ID Module 134, Comparator 136, PDL Search Module 138, Synchronization Strategy Module 140 and Buffer Interface 142. Physical Sector ID Module 134 analyzes the digital signals from Read Channel 132 to identify physical sector IDs associated with each sector read from a DVD. Physical Sector ID Module 134 couples physical sector IDs (PIDs) from the PDL (typically, a copy of the PDL residing in a memory) to Comparator 136.

PDL Search Module 138 uses a hardware defect search algorithm to minimize the time it takes to determine if the PID of the sector being processed is in the PDL. For example, a binary search algorithm may be used. Another exemplary search algorithm selects a subset of the sector IDs from the PDL that are in the vicinity of the sector being processed and copies them into a short table or cache. This table is then used by comparator 136 to determine whether the PID of the sector being processed is known to be defective. As the PID of the sector being processed increments to a number near the limit of the range of PIDs in the table the table is updated by copying new PIDs from the PDL. This operation may take place at the same time as the table is being read. (?)

If comparator 136 determines that there is a match between the PID of the sector being processed and the PID from PDL Search Module 138, comparator 136 asserts a Slip signal on line 137. The slip signal on line 137 is detected by Synchronization Strategy Module 140. Synchronization Strategy Module 140 analyzes the data from the disc represented by the digital signals on line 133 to extract embedded synchronization information in order to generate a timing signal which is output on line 141. This timing signal is used to synchronously clock the data on line 133 into the Buffer Interface and Parity Error Correction Module (Buffer Interface) 142. When the Slip signal on line 137 is asserted, Synchronization Strategy Module 140 forces the timing signal to an inactive state for the time that data is being read from the defective physical sector. In this way the disc drive prevents data from being written to the buffer interface 142. It should also be noted that assertion of the slip signal must also cause synchronization strategy module 140 to supresses a sync-lost mode which would otherwise occur when the timing signal is interrupted.

Buffer Interface 142 corrects parity errors in the digital data and then copies the corrected digital data, stripped of the PO and PI bytes, to Data Buffer 120. Inactivity of the timing signal prevents Buffer Interface 142 from writing corrupted data read from any defective physical sectors into Data Buffer 120. As a result, when reading from a DVD that uses the Slip Defect Management Scheme of the present invention, logical sectors of data are automatically sequentially copied into Data Buffer 120 according to logical sector ID without any interleaved corrupted data.

Figure 6:
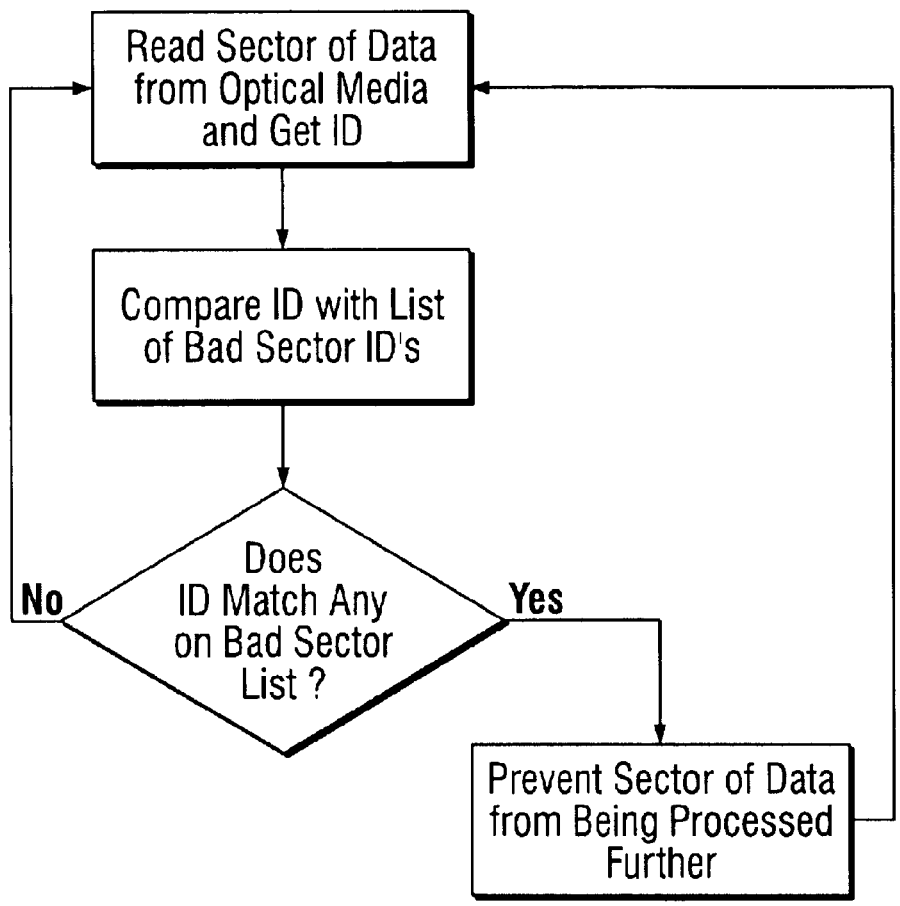
FIG. 6 illustrates a flow diagram of the operation of an embodiment of the present invention.
Figure 7:
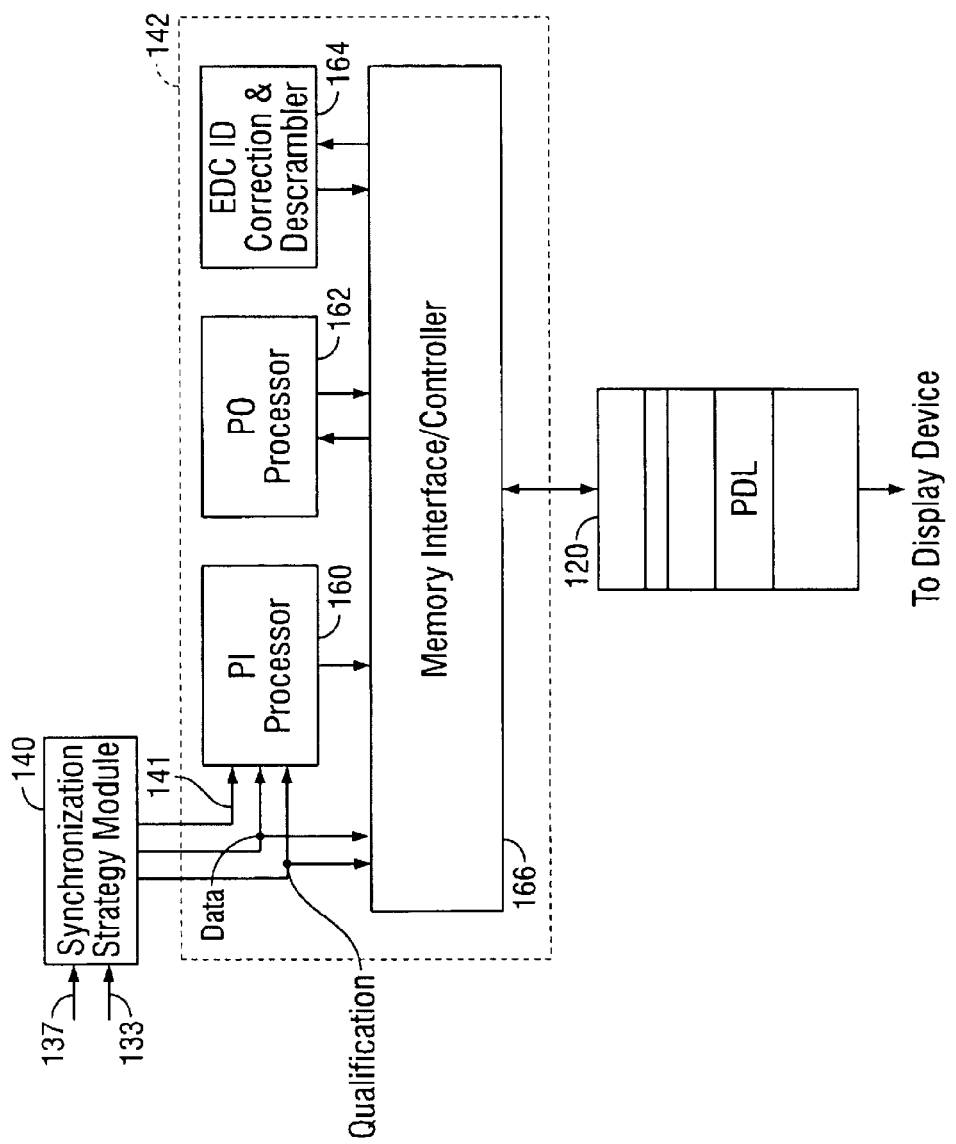
FIG. 7 illustrates in block diagram form aspects of a DVD in accordance with the invention.

FIG. 6 is a flow chart illustrating the basic operation of the embodiment of the present invention as described above. FIG. 7 illustrates Buffer Interface 142 of FIG. 5 in greater detail. Buffer Interface 142 includes PI Processor 160, PO Processor 162, EDC ID Correction and Descrambler 164 and Memory Interface/Controller 166. PI Processor 160 takes the PI data associated with each logical sector and performs an inward parity check. PI Processor 160 retrieves logical sectors whose parity is to be checked from a first scratchpad area within Data Buffer 120 that is inaccessible to the Display Device. PI Processor 160 returns the inward parity checked logical sector to a second scratchpad area of Data Buffer 120, which is also inaccessible to the Display Device. PO Processor 162 takes the PO data associated with each logical sector and performs an outward parity check. PO Processor 162 retrieves the logical sector to be checked from the second scratchpad area of Data Buffer 120 and, upon completion, copies the logical sector into a third scratchpad area of Data Buffer 120. The third scratchpad area is also inaccessible to the Display Device. EDC ID Correction and Descrambler 164 detects any logical sector ID errors and corrects them. EDC ID Correction & Descrambler 164 also descrambles the logical sector data. Afterward, EDC Correction & Descrambler 164 writes the descrambled logical sector into an area of Data Buffer 120 that is accessible to the Display Device when the Slip signal is asserted.

Figure 8:
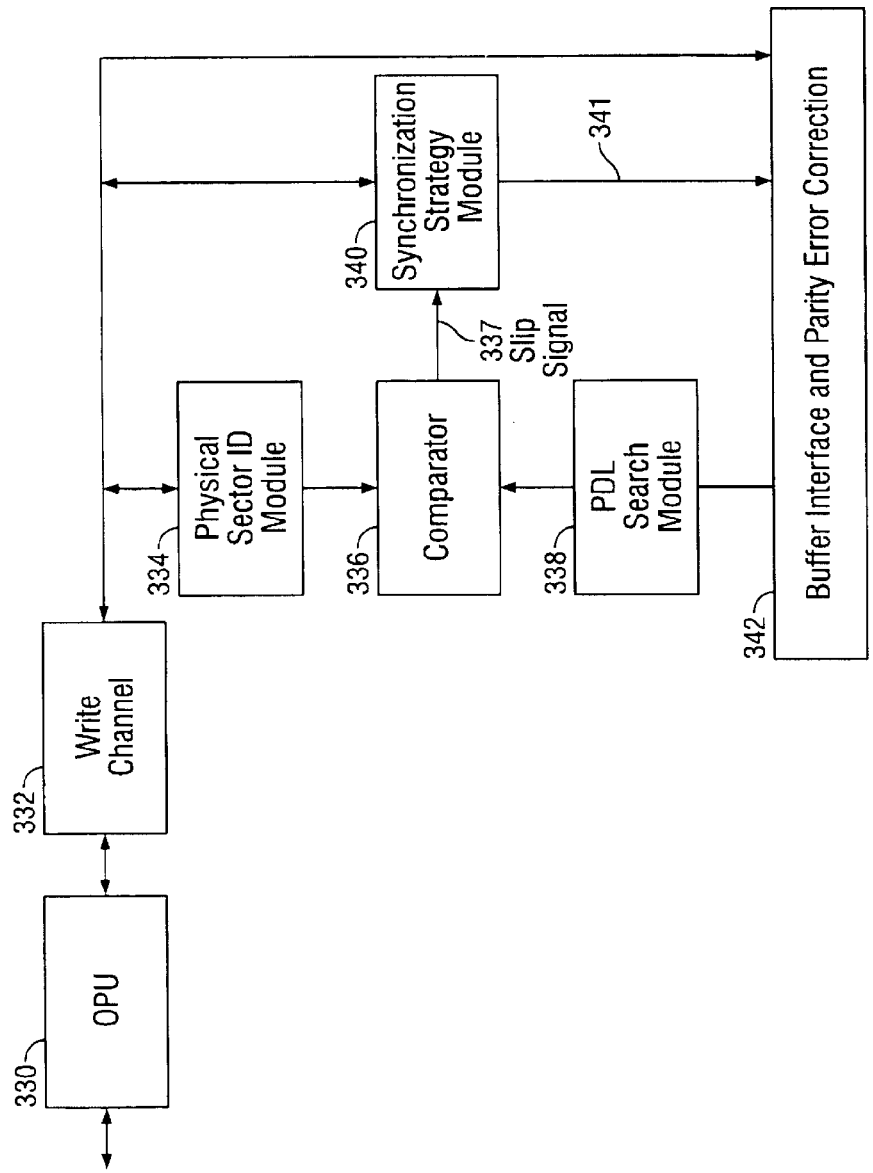
FIG. 8 illustrates an example of a Buffer Interface of a DVD in accordance with the invention.

As noted above, the present invention may also be employed in writing data to a DVD. The write operation will now be described. Writing data to disc is similar to the read operation. There are multiple ways to initiate a DVD write, as would be familiar to those of ordinary skill in the art. Referring to FIG. 8, in a write activity according to the present invention, a physical sector ID module 334 retrieves an initial header address of a sector (a PID) from the disc to be written. The PID is loaded into comparator 336, and the data is written to that sector by optical write unit 330 if the sector is found not to be defective. The PID address is then automatically incremented and the comparison repeated. For example, after writing to sector 25 the PID address will increment to 26, and after writing to sector 26 it will increment to 27, etc., until the write operation is completed. After the header address is incremented from the previous write, but before data for the next sector is actually written to disc, PDL search module 338 employs a defect search algorithm to consults a table of defective sector IDs (PIDs) in PDL search module 338 to determine if the sector about to be written to is defective. The search algorithm is optimized for speed so as not to delay the write operation.

In addition to consulting the PDL, which is compiled by the manufacturer of the disc, a second list of defective sectors is typically consulted in a write operation. This secondary defect list (SDL) is created by the user's DVD machine and contains PIDs of any additional defective sectors found on the disc in a write certification process, familiar to those of ordinary skill in the art. The write certification process is performed before the write operation is initiated. Preferably, instead of searching the entire list of defective sectors (in the write operation the PDL and SDL are combined), a table or cache of PIDs in the vicinity of the current sector is searched by PDL search module 338 in order to save time. Various search algorithms such as a binary search, may also be employed to further speed up the process.

If a match is found, a slip signal is asserted by comparator 336. The slip signal 337 is provided to synchronization strategy module 340 so that the write operation automatically slips the defective sector or sectors and writes data to the next available physical sector on the track. For example, if physical sector number 26 is defective, then logical header number 26 is written in physical sector number 27. It should be noted however that slipping is a cumulative activity. Thus, by the time header number 26 is reached, a large number of sectors may already have been slipped so the PID of the physical sector where the data actually gets written may be a much larger number. The write controller keeps track of this by writing a cumulative slip factor to the disc so that it can be easily determined how much slipping has been done and what physical sectors are being written to at any moment in time.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method comprising:
   reading data from at least one physical sector on an optical media,
   comparing an identifier (ID) of the physical sector to a list of IDs representing physical sectors containing corrupted data,
   if the physical sector ID does not match any one of the IDs on the list, writing the data to a data buffer, and
   if the physical sector ID matches any one of the IDs on the list, not writing the data to the data buffer.

2. The method of claim 1 wherein the step of comparing the sector ID with the list of IDs comprises comparing the sector ID with a table comprising a subset of the list of IDs.

3. The method of claim 2 wherein the step of comparing the sector ID with a table comprising a subset of the list of sector IDs further comprises comparing the sector ID to a subset of IDs, which are located near the sector ID.

4. The method of claim 1 wherein the step of suppressing the flow of data comprises asserting a slip signal.

5. The method of claim 4 wherein the step of suppressing the flow of data comprises interrupting a timing signal that clocks data into a buffer.

6. The method of claim 5 wherein the timing signal is derived from signals comprising synchronization information embedded in the data.

7. An apparatus, comprising:
- a physical sector ID module that identifies at least one physical sector ID from information read from an optical data storage medium;
- a physical defect memory that stores at least one address of a physical sector containing corrupted data on an optical data storage medium;
- search module that searches the physical defect memory and transmits an interrupt signal if a match occurs between the physical sector ID and the physical defect memory, wherein the interrupt signal prevents data in the physical sector represented by the physical sector ID from being written to a data buffer.

8. An apparatus comprising:
- means for reading data from at least one physical sector on an optical media,
- identifying a physical sector on an optical media,
- means for comparing an identifier (ID) of the physical sector to a list of IDs representing physical sectors containing corrupted data,
- means for writing the data to the data buffer if the sector ID does not match any one of the IDs on the list and suppressing a flow of data to the data buffer if the sector ID matches any one ID on the list.

* * * * *